(12) United States Patent
Pollklas et al.

(10) Patent No.: US 8,321,093 B2
(45) Date of Patent: Nov. 27, 2012

(54) AGRICULTURAL WORKING MACHINE

(75) Inventors: Manfred Pollklas, Rheda-Wiedenbrueck (DE); Daniel Immer, Herzebrock-Clarholz (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 485 days.

(21) Appl. No.: 12/174,008

(22) Filed: Jul. 16, 2008

(65) Prior Publication Data
US 2009/0030581 A1    Jan. 29, 2009

(30) Foreign Application Priority Data

Jul. 27, 2007   (DE) .......................... 10 2007 035 647

(51) Int. Cl.
*G06F 7/70* (2006.01)
(52) U.S. Cl. .......................... 701/50; 701/31.2; 340/442
(58) Field of Classification Search .................... 701/29, 701/50, 93; 340/442, 444
See application file for complete search history.

(56) References Cited

U.S. PATENT DOCUMENTS

| | | | |
|---|---|---|---|
| 4,894,639 A * | 1/1990 | Schmierer ...................... 340/444 |
| 5,065,134 A * | 11/1991 | Schmid et al. ................. 340/442 |
| 5,134,880 A * | 8/1992 | Gerhard ........................ 73/146.5 |
| 5,546,308 A * | 8/1996 | Yamamoto ....................... 701/93 |
| 6,098,682 A | 8/2000 | Kis |
| 6,434,470 B1 * | 8/2002 | Nantz et al. ...................... 701/93 |
| 6,510,375 B2 * | 1/2003 | Faye ............................... 701/93 |
| 6,604,025 B2 * | 8/2003 | Ries-Mueller ..................... 701/1 |
| 6,671,609 B2 * | 12/2003 | Nantz et al. ...................... 701/93 |
| 6,744,355 B2 * | 6/2004 | Kogure et al. ................. 340/442 |
| 7,295,103 B2 * | 11/2007 | Muller et al. .................. 340/443 |
| 2002/0032513 A1* | 3/2002 | Faye ............................... 701/93 |
| 2002/0069008 A1* | 6/2002 | Nantz et al. ...................... 701/93 |
| 2002/0196138 A1* | 12/2002 | Kogure et al. ................. 340/442 |
| 2003/0021330 A1* | 1/2003 | Aubel et al. .................... 374/142 |
| 2003/0033072 A1* | 2/2003 | Nantz et al. ...................... 701/93 |
| 2003/0144777 A1* | 7/2003 | Schmitt .......................... 701/29 |
| 2004/0003865 A1* | 1/2004 | Skoff .............................. 141/38 |
| 2004/0107036 A1* | 6/2004 | Hicks ............................. 701/93 |
| 2005/0000268 A1* | 1/2005 | Kuwata et al. ................. 73/1.75 |
| 2005/0107938 A1* | 5/2005 | Wetzel et al. ................... 701/70 |
| 2005/0150283 A1* | 7/2005 | Shick et al. ..................... 73/146 |
| 2006/0108863 A1* | 5/2006 | Gronau et al. ................. 303/122 |
| 2006/0145828 A1* | 7/2006 | Muller et al. .................. 340/442 |
| 2006/0220813 A1* | 10/2006 | Utter et al. .................... 340/442 |
| 2008/0061625 A1* | 3/2008 | Schmitt et al. ................. 303/146 |

FOREIGN PATENT DOCUMENTS
DE    198 04 249    8/1999
* cited by examiner

*Primary Examiner* — Helal A Algahaim
(74) *Attorney, Agent, or Firm* — Michael J. Striker

(57) ABSTRACT

The present invention relates to an agricultural working machine (2), in particular a forage harvester (1) with a device for adjusting the ground speed v, with which the maximum ground speed v of the agricultural working machine (2) is determined as a function of the tire pressure of at least one tire (14).

11 Claims, 2 Drawing Sheets

AGRICULTURAL WORKING MACHINE

CROSS-REFERENCE TO A RELATED APPLICATION

The invention described and claimed hereinbelow is also described in German Patent Application DE 10 2007 035 647.3 filed on Jul. 27, 2007. This German Patent Application, subject matter of which is incorporated herein by reference, provides the basis for a claim of priority of invention under 35 U.S.C. 119(a)-(d).

BACKGROUND OF THE INVENTION

The present invention relates to an agricultural working machine with a device for adjusting the ground speed.

With agricultural working machines such as forage harvesters, there is a need to adjust the air pressure in the tires depending on the ground being driven over, in particular to reduce the stress on the ground. Lowering the tire pressure increases the ground contact area, which results in less damage being done to the ground being driven over. The tire pressure is increased for street driving, however, since a higher pressure is required at high speeds to prevent tire damage.

Publication DE 198 04 249 describes a device and a method for adjusting the tire pressure, with which the air pressure in the tire is adjusted—during travel—to the particular circumstances. The tire pressure is regulated as a function of specific state variables, such as axle load, speed, and tension force. Basically, the tire pressure should be adapted to the particular circumstances as quickly as possible, with as few driving interruptions as possible, and via remote control from the driver's cab.

The disadvantage of this embodiment is that it is not possible to adjust the tire pressure to changing circumstances immediately. With a forage harvester, for example, the tire pressure is reduced to approximately 0.8 bar while a field is being worked. If, on the other hand, the forage harvester is operated briefly in the street-driving mode when moving to a different field, a tire pressure control system, for instance, is unable—due to the tire volume—to briefly increase the tire pressure to approximately 2.5, which is typically required for street operation, or the driver simply drives to the other field without raising the tire pressure at all. When a forage harvester is driven at permissible ground speeds of up to 40 km/h with low tire pressure, however, the tire may detach from the wheel rim, particularly when driving around a curve, thereby endangering the agricultural working machine and the driver.

SUMMARY OF THE INVENTION

The object of the present invention, therefore, is to avoid the disadvantages of the cited related art and to refine an agricultural working machine of the type described initially such that dangerous situations are avoided that may be caused by a tire becoming detached from the wheel rim because it was not possible to quickly adjust the tire pressure to the ground speed when circumstances changed particularly quickly.

This object is attained according to the present invention by the characterizing features of Claim 1. Features that advantageously refine these means of attaining the object of the present invention are listed in the further claims.

Given that the maximum ground speed of the agricultural working machine is determined as a function of the tire pressure of at least one tire, it is ensured that dangerous situations are prevented that occur when a tire becomes detached from the wheel rim because it was not possible to immediately adjust the tire pressure to the ground speed when quickly switching from the harvesting mode to the street-driving mode, and it was still possible to drive the working machine at the maximum permissible speed—which is up to 40 km/h for a forage harvester—despite the low tire pressure. Preferably, different tire sizes and/or tire types and/or the ground inclination are also taken into consideration, so that the special equipment of every working machine or special working conditions is/are taken into account.

To most effectively prevent the dangerous situation to the driver and the agricultural working machine that occurs when a tire becomes detached from a wheel rim, the maximum permissible ground speed is determined with reference to at least one characteristic curve, which takes into account the parameter of tire pressure, at the least. With reference to a characteristic curve of this type, it is possible to optimally adjust the maximum ground speed—as a function of tire pressure—that may be driven without the risk of danger. Preferably, the characteristic curve includes consideration for the parameters of tire size and/or tire type, in accordance with the machine equipment.

In an advantageous refinement of the present invention, the at least one characteristic curve is stored in a memory, thereby providing a control and evaluation unit direct access to the preselected, tire pressure-dependent ground speeds at which the working machine may be operated safely. In the simplest case, the preselected, tire pressure-dependent ground speeds, the tire size, and tire type are advantageously entered in the memory via a control panel.

Given that the pressure of at least one tire is determined in a control and evaluation unit using an output signal generated by at least one sensor, and that the control and evaluation unit queries the tire pressure-dependent, preselected, maximum driveable ground speed stored in the memory device based on the output signal that was generated, and the queried ground speed value is transmitted to the ground speed control device for automatic regulation of the ground speed, the driver is advantageously put at ease, since he need not worry that a tire may become detached from the wheel rim because he unknowingly exceeded the maximum ground speed that may be driven safely with the particular tire pressure, thereby allowing him to concentrate fully on the working operation.

In an advantageous refinement of the present invention, the agricultural working machine is operated, at the maximum, only at the ground speed that corresponds to the preselected ground speed value of the lowest tire pressure sensed by the at least one sensor when the sensor detects different tire pressures in various tires of the working machine, so that, e.g., if pressure in one tire should suddenly drop, the maximum drivable ground speed is adjusted accordingly.

In the simplest case, it is possible to display the tire pressure-dependent, maximum driveable ground speed to the driver of the agricultural working machine via a display unit, so that the driver may adjust the maximum driveable ground speed using suitable actuating elements.

According to an advantageous refinement of the present invention, when the maximum driveable ground speed is not adjusted automatically, an optical and/or acoustic warning signal is output via a signal transducer to the driver via a display unit when it is detected that the maximum driveable ground speed has been exceeded, thereby enabling the driver to reduce the ground speed immediately.

Further advantageous embodiments are the subject of further subclaims and will be explained in greater detail below with reference to two drawings.

DESCRIPTION OF THE PREFERRED EMBODIMENTS

Figure 1:
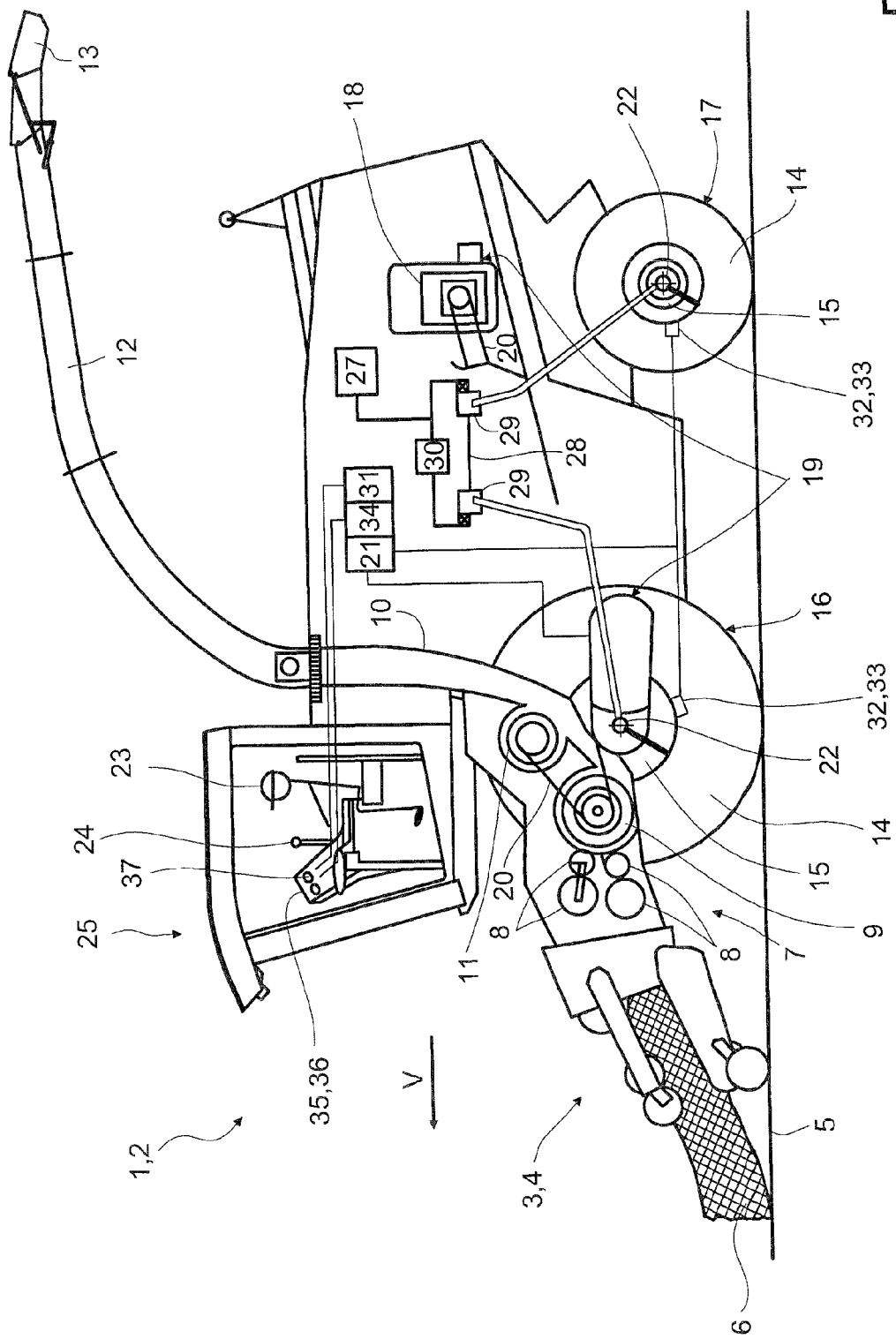
FIG. 1 shows an agricultural working machine in the form of a forage harvester, with a schematically depicted control and evaluation unit.

FIG. 1 shows an agricultural working machine 2 designed as a forage harvester 1, which includes a front attachment 4 designed as a pick-up 3, which picks up crop material 6, e.g., grass, lying on ground 5. In pick-up 3, picked-up crop material 6 is compressed to the width of intake conveyor mechanism 7 and is passed on to intake conveyor mechanism 7. Crop material 6 is then compressed between intake rollers 8 located in intake conveyor mechanism 7 and is conveyed further to downstream chopper drum 9. Rotating chopper drum 9 chops crop material 6 into a specifiable post-accelerator 11 engages in the crop material flow and accelerates it along upper discharge chute 12 to ensure it is transferred reliably to a not-shown hauling container. A discharge flap 13 for determining the outflow direction of crop material 6 is located at the end of discharge chute 12. Forage harvester 1 also includes front wheels 16, which are composed of a tire 14 and a wheel rim 15, and rear wheels 17. Forage harvester 1 includes a drive motor 18, which drives a ground drive 19 for driving front wheels 16. Drive motor 18 also drives—via a common drive belt 20—chopper drum 9, post-accelerator 11, intake conveyor mechanism 7, and front attachment 4.

Ground drive 19 is equipped with a ground speed control device 21, which automatically and regulates ground speed V of forage harvester 1. A rotational speed sensor 22 is located on ground drive 19; it detects, in a manner known per se, ground speed v and the direction of travel of forage harvester 1. Rotational speed sensor 22 generates a ground-speed signal vs, which is proportional to ground speed v when forage harvester 1 is traveling in a forward direction. As is known and will therefore not be described in greater detail, a hydrostatic, not-shown ground drive 19 may also be used in the forage harvester. Depending on the requirements of driver 23, a not-shown actuating signal is transmitted via the position of ground speed control lever 24 in driver's cab 25, that is, the deflection of ground speed control lever 24 is ascertained using a not-shown angular-position sensor and, based on this angular deflection, ground speed signal vs is generated, thereby ensuring that desired ground speed v is attained.

To control the tire pressure, forage harvester 1 includes a tire pressure control system 26 that is known per se. With a forage harvester 1, for example, the tire pressure may be reduced to approximately 0.8 bar—other values are also feasible—during field operation. Tire pressure control system 26 is composed of an air compressor 27, which is connected via supply lines 28 to tires 14. Adjustable valves 29 are installed in supply lines 28, which make it possible to inflate and deflate tire 14 and/or to maintain the tire pressure in a controlled manner. Valves 29 are connected to a control unit 30 that controls the position of valves 29. When forage harvester 1 is operated briefly in the street-driving mode when moving to a different field to be worked, the tire pressure should be increased manually or using the tire pressure control system to approximately 2.5—other values are also feasible—to ensure that the permissible street-driving speed of up to 40 km/h may be driven safely. Previously, tire pressure control systems 26—which are known per se—have not been capable, due to the volume of tire 14, to briefly increase the tire pressure to the required value of approximately 2.5 bar. As a result, an inexperienced driver 23, in particular, of a forage harvester 1 may travel at a speed of up to 40 km/h—which is basically permissible for a forage harvester 1—despite the tire pressure being too low, when moving to a different field to be worked. It is then possible, in particular when traveling around a curve, for tire 14 to become detached from wheel rim 15, which is a dangerous situation for agricultural working machine 2 and its driver 23.

According to the present invention, it is now provided that the maximum ground speed v of forage harvester 1 is determined as a function of the tire pressure of at least one tire 14. The parameter of tire pressure, at the least, may be entered in a memory device 31, in which case a maximum driveable ground speed v is assigned to every pressure value, e.g., in a pressure range of 0.0 to 2.5 bar, in increments of tenths. In the exemplary embodiment, the tire pressure of the tires is ascertained using sensors 33, which are designed as pressure sensors 32. The pressure signal, which is generated by sensors 33 and represents the current tire pressure, is forwarded to a control and evaluation unit 34, which is connected with memory device 31. Based on the pressure value that is ascertained, the particular maximum driveable ground speed value—which may be entered via control panel 35 and is stored in memory device 31—is queried. The queried ground speed value is forwarded to a ground speed control device 21, which compares it with the current maximum driveable ground speed v and makes a change, if necessary.

It is also feasible that the particular maximum driveable ground speed v is adjusted via the deflection of ground speed control lever 24 for forward-travel ground speed v using means that are not shown here. As explained in greater detail below with reference to FIG. 2, it may be provided, according to the present invention, that particular tire pressure-dependent, maximum driveable ground speed v is determined with reference to a characteristic curve k stored in memory device 31, and it is controlled using a control and evaluation unit 34.

It is also feasible that the maximum driveable ground speed v, which corresponds to the tire pressure and is stored in memory device 31, is displayed to driver 23 in driver's cab 25 via a display unit 36, thereby informing driver 23 of the maximum ground speed v at which agricultural working machine 2 may be driven and enabling him to adjust ground speed v accordingly, without his having to fear that tire 14 may become detached from wheel rim 15. If an inexperienced driver 23, in particular, would still exceed maximum driveable ground speed v for the particular tire pressure, it may be provided that an optical and/or acoustic warning signal is output via a not-shown signal transducer, thereby enabling driver 23 to manually adjust ground speed v immediately using ground speed control lever 24.

It is also feasible to install an emergency button 37 near control panel 35, which driver 23 may activate when he has exceeded the actual maximum driveable ground speed v, with the result being that ground speed v is reduced automatically. It may be specified on an individual basis whether ground speed v is reduced only to maximum driveable ground speed v corresponding to the particular tire pressure or to an even lower ground speed v.

In an advantageous refinement of the present invention, agricultural working machine 1 is operated, at the maximum, only at ground speed v that corresponds to the preselected ground speed value of the lowest tire pressure sensed by sensors 33 when sensor 33 detects different tire pressures in various tires of working machine 2, so that, e.g., if the pressure in one tire 14 should suddenly drop, maximum drivable ground speed v is adjusted accordingly. It may also be provided that the slip of wheel rim 15 relative to tire 14—which is sensed using not-shown slip sensors—is taken into account in the determination of ground speed v, which is dependent on tire pressure. During a harvesting operation in particular, tires 14 have a lower tire pressure in order to minimize damage to the ground. As a result, if ground speed v is too high, wheel rim 15 may slip relative to tire 14 and the tire may become detached from wheel rim 15. It is also feasible that, when it is sensed that wheel rim 15 slips relative to tire 14, the tire pressure is increased using tire pressure control system 26 to prevent tire 15 from becoming detached from wheel rim 14.

Figure 2:
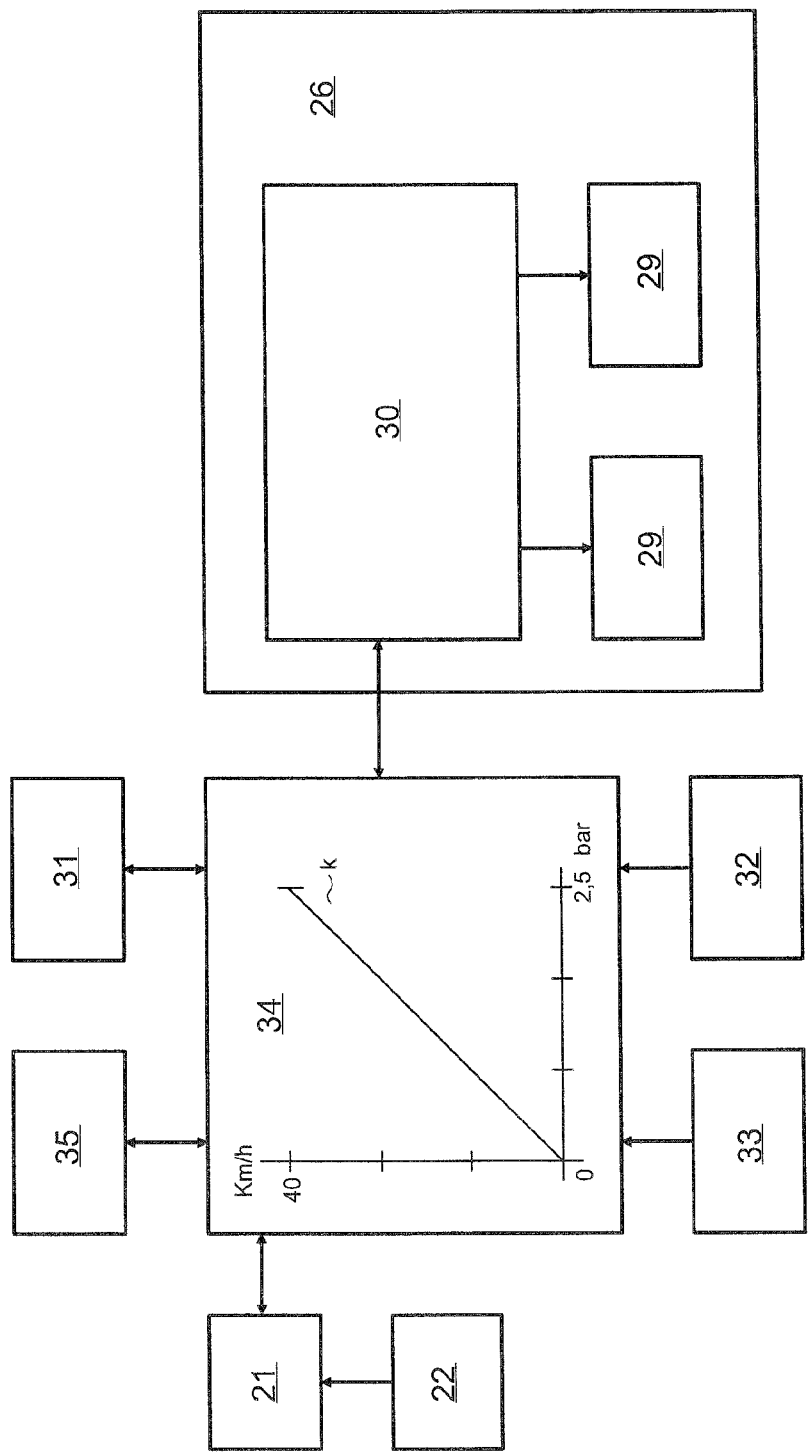
FIG. 2 shows a specific depiction of a control and evaluation unit.

FIG. 2 shows control and evaluation unit 34, which is connected with memory device 31, ground speed control device 21, tire pressure control system 26, control panel 35, and sensors 33. At least one characteristic curve k is stored in memory device 31, which determines the particular, inventive correlation between the tire pressure and the particular maximum driveable ground speed v. The tire pressure-dependent, maximum driveable ground speed v is specified manually by driver 23 via an entry in control panel 35, or it is already specified in memory device 31 based on the tires that are installed on forage harvester 1. It is also feasible that characteristic curve k accounts for the tire size and/or the tire type and/or the ground inclination (not shown), in order to be able to optimally establish the particular maximum driveable ground speed v, to ensure safe working operation of agricultural working machine 1. Characteristic curve k shown has a common origin and a common end point. The origin shows a tire pressure of 0 bar, therefore representing a fully deflated tire 14, which absolutely should not be driven on, and is therefore assigned a maximum driveable ground speed v of 0 km/h. The end point of the characteristic curve is determined by the maximum tire pressure specified by the manufacturer, e.g., 2.5 bar in this case, given a maximum ground speed v of, e.g., 40 km/h, as permitted by the TÜV. The intermediate values are calculated based on a proportional relationship between the tire pressure and the particular maximum driveable ground speed v.

In accordance with the tire pressure detected by sensors 33, the related maximum driveable ground speed v is queried with reference to characteristic curve k stored in memory device 31. The ground speed value that is ascertained is transmitted to ground speed control device 21, which limits ground speed v accordingly. This process is repeated continually, so that maximum driveable ground speed v may be adjusted depending on any changes in the tire pressure.

It is within the scope of the ability of one skilled in the technical art to modify the exemplary embodiment described in a manner not presented, or to use it in other agricultural working machines—in particular combine harvesters and tractors—to achieve the effects described, without leaving the framework of the present invention.

The present invention could also be used, e.g., for combinations of a tractor and a trailing vehicle with a tire pressure control system, in which case the ground speed of the tractor would be determined as a function of the tire pressure of the tire of the trailing vehicle.

The invention claimed is:

1. An agricultural working machine, comprising:
   a tire pressure control system (26) for inflating and deflating a tire (14) to control an air pressure level of the tire such that during street operation the tire air pressure is at a street pressure level and during field operation the tire air pressure is at a field pressure level that is reduced compared to the street pressure level; and
   a device for adjusting a ground speed, wherein a maximum ground speed (v) of the agricultural working machine (2) is determined as a function of the tire air pressure of the tire (14) using a tire air pressure sensor (33) in the tire, and
   wherein a maximum driveable ground speed (v) that depends on the tire air pressure is preselectable for different tire sizes, for different tire types or both.

2. The agricultural working machine as recited in claim 1, wherein the maximum driveable ground speed (v) is determined with reference to at least one characteristic curve k, which accounts for at least a parameter of tire air pressure of the tire (14).

3. The agricultural working machine as recited in claim 2, wherein the at least one characteristic curve k also accounts for a parameter of tire type and/or tire size.

4. The agricultural working machine as recited in claim 2, further comprising a memory device (31) and a control panel (35), wherein the at least one characteristic curve k is storable in the memory device (31), wherein a particular preselected, tire pressure-dependent, maximum ground speed value, tire type, and tire size is enterable in the memory device (31) via the control panel (35).

5. The agricultural working machine as recited in claim 4, wherein the tire air pressure sensor (33) generates an output signal processed in a control and evaluation unit (34), which queries a preselected maximum driveable ground speed (v) stored in the memory device (31) according to the output signal, and wherein the queried ground speed (v) value is transmitted to a ground speed control device (21) for automatic control of the ground speed (v).

6. The agricultural working machine as recited in claim 5, wherein the agricultural working machine (2) comprises at least two tires (14) and is configured to be operated at a maximum ground speed (v) corresponding to a preselected ground speed value of the lowest tire pressure sensed by the tire air pressure sensor (33) when different tire air pressures are detected in the at least two tires (14).

7. The agricultural working machine as recited in claim 1, wherein a tire pressure-dependent, maximum driveable ground speed (v) is displayed to a driver (23) of the agricultural working machine (2) via a display unit (36) in a driver's cab (25), and further comprising actuating elements configured for adjustment by the driver (23) of the maximum driveable ground speed (v).

8. The agricultural working machine as recited in claim 1, wherein, if the maximum driveable ground speed (v) that is determined as a function of the tire air pressure is exceeded, an optical and/or acoustic warning signal is output to a driver (23) via a signal transducer, and/or a ground drive (19) of the agricultural working machine (2) is automatically regulated down to a maximum driveable ground speed (v) that was preselected based on the detected tire air pressure.

9. The agricultural working machine as recited in claim 1, wherein the agricultural working machine (2) is a combine harvester, a forage harvester (1), or a tractor.

10. The agricultural working machine as recited in claim 1, wherein the tire pressure control system (26) includes a control unit (30) and adjustable valves (30), which together effect the inflating and deflating of the tire (14).

11. The agricultural working machine as recited in claim 10, wherein the tire pressure control system (26) further includes a compressor (27) and supply lines (28) for supplying air to the tire (14).

* * * * *